(No Model.)

W. KYLE.
TORSION SPRING GEAR FOR VEHICLES.

No. 535,448. Patented Mar. 12, 1895.

Witnesses.
Victor J. Evans.
A. L. Evans.

Inventor.
William Kyle,
by W. A. Redmond,
Atty.

UNITED STATES PATENT OFFICE.

WILLIAM KYLE, OF BROCKVILLE, CANADA.

TORSION-SPRING GEAR FOR VEHICLES.

SPECIFICATION forming part of Letters Patent No. 535,448, dated March 12, 1895.

Application filed July 16, 1894. Serial No. 517,701. (No model.) Patented in Canada July 27, 1894, No. 46,678.

*To all whom it may concern:*

Be it known that I, WILLIAM KYLE, a subject of the Queen of Great Britain, residing at Brockville, in the Province of Ontario, Canada, have invented certain new and useful Improvements in Torsional-Spring Running-Gear for Vehicles, (for which Canadian Letters Patent No. 46,678 were granted to me July 27, 1894;) and I do hereby declare the following to be a full, clear, and exact description of the invention, such as will enable others skilled in the art to which it appertains to make and use the same.

This invention relates generally to vehicles, and particularly to the running gear thereof and it has for its object to provide a simple, durable, and comparatively inexpensive torsional spring running gear adapted to permit of a wide range or variation of inclination of the axles while the vehicle is in use without a corresponding inclination or tilting of the body of the vehicle, and it consists in the parts and combinations of parts hereinafter fully described and claimed.

Figure 1:
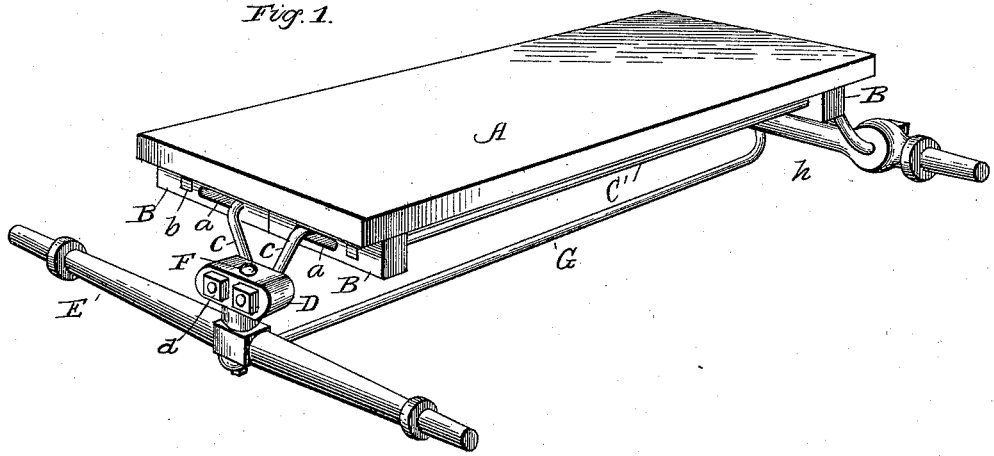
Figure 2:
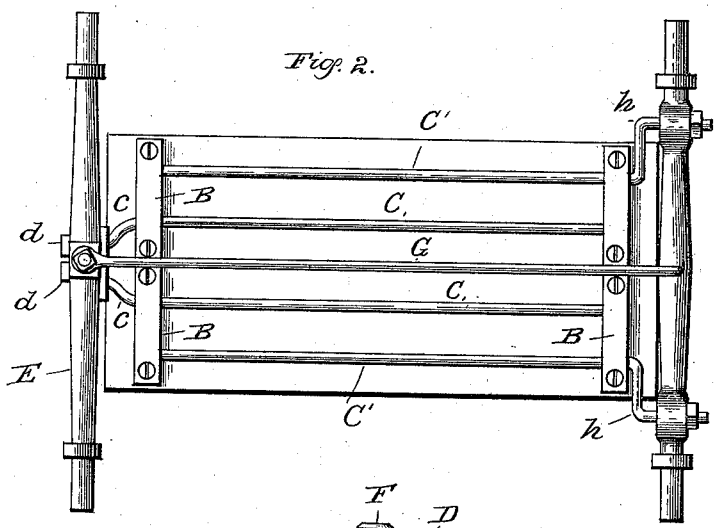
Figure 3:
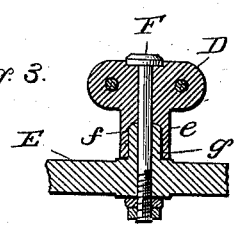

In the accompanying drawings forming a part of this specification, Figure 1 is a perspective view of my invention applied to the bed of a vehicle; Fig. 2, a plan view of the same; and Fig. 3 a detail of the socket joint. Similar letters refer to similar parts throughout the several views.

A represents the bed of a vehicle to the under side of which is secured the running gear, either directly as shown, or through the medium of bolsters or other bed pieces as desired.

B represents the bearing blocks which are secured to each end of and across the bed or to the bolsters by means of screws or bolts or otherwise so as to fasten them rigidly in place, said blocks being each formed with an elongated slot, $a$, and a perforation, $b$, the latter being preferably square or angular to receive snugly the correspondingly shaped end of the torsional spring rods C and C'. In this instance I have shown four bearing blocks B, but only two such may be employed, if desired, in which event two slots, $a$, and two perforations, $b$, are formed in each block. The spring rods C are arranged at each side of and adjacent the median line of the bed of the vehicle and have their squared ends inserted in the rear bearing blocks B and extend forward to and through the slots $a$ in the forward bearing blocks and are bent downwardly and laterally toward each other, as at $c$, and outwardly and are screw-threaded. The screw-threaded ends of the rods C are inserted loosely in openings formed in the wings of a socket joint D and are secured in place by nuts, $d$. The joint D is formed with a downward extension $e$ in which a tubular recess $f$ is formed to receive a similar tubular extension, $g$, cast or otherwise formed on and projecting from the center of the fore axle E. A king bolt F passes through the joint D and into and through the extension $g$ and through the axle E and receives on its projecting end one end of the reach G which is formed with an eye for this purpose. The other end of the reach is bent upwardly and passes through an opening in the center of the rear axle and a nut is run thereon to secure it in place. The ends of outer spring rods, C', are secured in the perforations $b$ in the bearing blocks, B, at the forward end of the vehicle and the rear ends of said rods extend through the slots, $a$, in the rear bearing blocks and are bent downwardly and outwardly, away from each other, as at $h$, and then on a horizontal plane, passing through openings formed therefor in the rear axle and having nuts run on the projecting ends thereof to secure said springs in place.

It will be observed that my construction and arrangement of the parts of my invention produce a very simple but durable running gear in which the springs are so arranged as to permit of either one of the wheels passing over obstructions without at all affecting the position of the body of the vehicle which moves along in the same horizontal plane no matter what the angle of inclination assumed by the axles; owing to the arrangement of the rods C at each side of and adjacent the median line of the bed of the vehicle and the attachment of their bent ends to the socket joint, thus permitting of a wide variation of movement of the ends of the axle with but a short movement of the bent ends of the rods C, and, also, that the strain of moving the vehicle is exerted through the springs, the fore axle drawing directly from the rear end of the body and the rear axle from the fore end thereof through its springs, thus drawing the body together instead of apart as is the case in all other running gears with which I am familiar.

Having thus described my invention, what I claim as new, and desire to secure by Letters Patent, is—

1. The combination, in a vehicle running gear, of the torsional spring rods C arranged at each side of and adjacent the median line of the body of the vehicle and having their rear ends rigidly secured to the rear end of the vehicle body and their fore ends bent at right angles and inclining toward each other, and a socket joint having perforated wings to receive the ends of said rods and pivotally mounted directly to the fore axle, substantially as described.

2. The combination, in a vehicle running gear, of the outer torsional springs C' secured at one end to the fore end of the vehicle bed and having their other ends bent at right angles in opposite directions, the rear axle having perforated bosses to receive the ends of said spring rods, the inner torsional spring rods C secured to the rear end of the vehicle bed and having their other ends bent at right angles and inclining toward each other, a socket joint having perforated wings, a fore axle having a tubular extension adapted to enter said socket joint, and a pin for securing said joint in position, substantially as described.

In testimony whereof I affix my signature in presence of two witnesses.

WILLIAM KYLE.

Witnesses:
WM. GILLERLAIN,
HUGH MORRISON.